United States Patent [19]

Kao et al.

[11] Patent Number: 5,030,605

[45] Date of Patent: Jul. 9, 1991

[54] CATALYST FOR REGULATING THE MOLECULAR WEIGHT DISTRIBUTION OF ETHYLENE POLYMERS

[75] Inventors: Sun-Chueh Kao, Piscataway; Frederick J. Karol, Belle Mead, both of N.J.

[73] Assignee: Union Carbide Chemicals and Plastics Technology Corporation, Danbury, Conn.

[21] Appl. No.: 459,382

[22] Filed: Dec. 29, 1989

[51] Int. Cl.$^5$ ................................................ C08F 4/68
[52] U.S. Cl. .................................... 502/120; 502/112; 502/123; 502/125; 502/126; 502/127; 502/128; 502/132; 502/110; 526/129

[58] Field of Search ............... 502/112, 120, 123, 125, 502/126, 127, 128, 132, 110

[56] References Cited

U.S. PATENT DOCUMENTS 4,232,140 11/1980 Ort ................................... 502/128 X
4,508,842 4/1985 Beran et al. .......................... 502/112

*Primary Examiner*—Patrick P. Garvin
*Attorney, Agent, or Firm*—John S. Piscitello

[57] ABSTRACT

A vanadium-based catalyst is treated with certain alkyl-aluminum alkoxide compounds as a means of narrowing and effectively regulating the molecular weight distribution of the polymers produced with the catalyst.

12 Claims, No Drawings

5,030,605

CATALYST FOR REGULATING THE MOLECULAR WEIGHT DISTRIBUTION OF ETHYLENE POLYMERS

FIELD OF THE INVENTION

This invention relates to a vanadium-based catalyst suitable for regulating the molecular weight distribution of ethylene polymers.

BACKGROUND OF THE INVENTION

U.S. Pat. No. 4,232,140 discloses a vanadiumcontaining catalyst system for polymerizing ethylene comprising:
  (A) a solid catalyst component containing:
    (a) a vanadium chloride,
    (b) an alkylaluminum alkoxide, and
    (c) an inert inorganic support,
  (B) an alkylaluminum cocatalyst, and
  (C) trichlorofluoromethane.

However, this reference does not disclose use of an electron donor in such catalyst system nor provide means for regulating the molecular weight distribution of the polymers produced with such catalyst system.

U.S. Pat. No. 4,508,842 discloses a highly active vanadium-containing catalyst capable of producing ethylene polymers having a broad molecular weight distribution. Said catalyst comprises:
  (A) a solid catalyst component consisting essentially of
    (1) an inorganic carrier, as support for
    (2) the reaction product of (a) a vanadium trihalide and (b) an electron donor, and
    (3) a boron halide or alkylaluminum compound,
  (B) an alkylaluminum cocatalyst, and
  (C) a halohydrocarbon polymerization promoter.

The polymers produced in accordance with U.S. Pat. No. 4,508,842 have a relatively broad molecular weight distribution, and excellent extrudability. These properties render them extremely useful in a wide variety of applications, such as wire and cable insulation, blow molding, film, and pipe fabrication. However, such polymers cannot be used in other applications, such as injection molding, which require a narrower molecular weight distribution.

SUMMARY OF THE INVENTION

In accordance with the present invention, it has now been discovered that the molecular weight distribution of ethylene polymers produced employing a vanadium-based catalyst system comprising:
  (A) a solid catalyst component consisting essentially of
    (1) a solid, particulate, porous inorganic carrier, as support for
    (2) the reaction product of (a) a vanadium trihalide and (b) an electron donor, and
    (3) a boron halide or alkylaluminum compound,
  (B) an alkylaluminum cocatalyst, and
  (C) a halohydrocarbon polymerization promoter,
can be narrowed and effectively regulated within a wide range by substituting an alkylaluminum alkoxide compound for the boron halide or alkylaluminum compound presently employed in catalyst component (A), said alkylaluminum alkoxide compound having the formula:

$$R_nAl(OR^1)_{3-n}$$

wherein:
  R and $R^1$ are alkyl radicals containing from 1 to 14 carbon atoms, which radicals may be the same or different, and
  n is an integer having a value of from 1 to 2.

Thus, the catalyst system of the present invention comprises:
  (A) a solid catalyst component consisting essentially of
    (1) a solid, particulate, porous inorganic carrier, as support for
    (2) the reaction product of (a) a vanadium trihalide and (b) an electron donor,
    (3) an alkylaluminum alkoxide molecular weight distribution (MWD) regulator having the formula $R_nAl(OR^1)_{3-n}$, wherein R, $R^1$ and n are as defined above,
  (B) an alkylaluminum cocatalyst, and
  (C) a halohydrocarbon polymerization promoter.

DETAILED DESCRIPTION OF THE INVENTION

As a result of the present invention, it is now possible to effectively regulate the molecular weight distribution (MWD) of ethylene polymers produced by means of a vanadium-containing catalyst system within a wide range by varying the amount of alkylaluminum alkoxide compound $R_nAl(OR^1)_{3-n}$ employed in the preparation of said catalyst system. Surprisingly, at atomic ratios of aluminum to vanadium of 2 or more, the catalyst systems containing these alkylaluminum alkoxide MWD regulators have been found to be significantly more active than catalyst systems prepared using a boron halide or alkylaluminum compound as catalyst modifier. As a result, it is possible to produce ethylene polymers by means of these catalyst systems having narrow-to-intermediate molecular weight distributions at enhanced levels of catalyst activity and polymer productivity. By the effective use of these alkylaluminum alkoxide MWD regulators together with a suitable chain transfer agent, such as hydrogen, to control the molecular weight of the polymers, it is now possible, by means of this system, to tailor polymer properties for use in a wide variety of applications. The substitution of an alkylaluminum alkoxide for the boron halide or alkylaluminum compounds previously employed as catalyst modifiers appears to cause no deterioration in bulk density or other properties of the polymers produced with these catalyst systems, or in the hydrogen response and comonomer response of these systems.

The polymers produced with the catalyst system of the present invention have a molecular weight distribution (MWD), defined as the ratio of weight average molecular weight to number average molecular weight ($M_w/M_n$), of less than 20 to as low as 4. Another means of indicating the molecular weight distribution of a polymer is by the melt flow ratio (MFR) of that polymer. By melt flow ratio is meant the flow index : melt index ratio of the polymer, wherein flow index and melt index are determined in accordance with ASTM D-1238, Conditions F and E, respectively. The polymers produced with the catalyst system of the present invention have a melt flow ratio of less than 120 to as low as 30. For these polymers, such MFR values correspond to the $M_w/M_n$ values set forth above.

The polymers produced with the catalyst system of the present invention have a melt index of from greater than 0 g/10 minutes to about 500 g/10 minutes, usually of from about 0.1 g/10 minutes to about 100 g/10 minutes. The melt index of a polymer varies inversely with its molecular weight and is a function of the hydrogen/monomer ratio employed in the reaction system, the polymerization temperature, and the density of the polymer. Thus, the melt index is raised by increasing the hydrogen/monomer ratio, the polymerization temperature, and/or the ratio of higher alpha olefin to ethylene employed in the reaction system.

As indicated above, both the molecular weight and the molecular weight distribution of the polymers can vary widely depending upon the amount of alkylaluminum alkoxide MWD regulator present in the catalyst system employed to produce such polymers and the amount of chain transfer agent present during polymerization. As a result, a broad variety of polymers having widely varying properties can be produced.

The polymers produced with the catalyst system of the present invention are also characterized by a density of from about 0.86 g/cm$^3$ to about 0.96 g/cm$^3$. Such polymers generally contain at least 50 mol percent of polymerized ethylene and no more than 50 mol percent of polymerized alpha olefin containing from 3 to 8 carbon atoms and, optionally, polymerized diene. When polymerized diene is present, the polymer ordinarily contains from 0.01 mol percent to 10 mol percent of at least one such diene, from 6 mol percent to 55 mol percent of at least one polymerized alpha olefin containing from 3 to 8 carbon atoms, and from 35 mol percent to 94 mol percent of polymerized ethylene Catalyst component (A) consists essentially of:
(1) a solid, particulate, porous inorganic carrier, as support for
(2) the reaction product of (a) a vanadium trihalide and (b) an electron donor,
(3) an alkylaluminum alkoxide molecular weight distribution (MWD) regulator having the formula $R_nAl(OR^1)_{3-n}$, wherein R, R$^1$ and n are as defined above.

The vanadium trihalide which is reacted with the electron donor in the preparation of catalyst component (A) is preferably vanadium trichloride, although the halogen present in said vanadium trihalide may be chlorine, bromine or iodine, or any mixture thereof.

The electron donor employed is a liquid, organic Lewis base in which the vanadium trihalide is soluble.

Suitable electron donors include alkyl esters of aliphatic and aromatic carboxylic acids, aliphatic ketones, aliphatic amines, aliphatic alcohols, aliphatic ethers and cycloaliphatic ethers. Particularly useful are alkyl esters of saturated aliphatic carboxylic acids containing from 1 to 4 carbon atoms; alkyl esters of aromatic carboxylic acids containing from 7 to 8 carbon atoms; aliphatic ketones containing from 3 to 6 carbon atoms, preferably from 3 to 4 carbon atoms; aliphatic amines containing from 1 to 14 carbon atoms, preferably from 2 to 8 carbon atoms; aliphatic alcohols containing from 1 to 8 carbon atoms, preferably from 2 to 8 carbon atoms; aliphatic ethers containing from 2 to 8 carbon atoms, preferably from 4 to 5 carbon atoms; and cycloaliphatic ethers containing from 4 to 5 carbon atoms, preferably mono- or di- ethers containing 4 carbon atoms. The aliphatic and cycloaliphatic ethers are most preferred, particularly tetrahydrofuran. If desired, these electron donors may be substituted with one or more substituents which are inert under the reaction conditions employed during reaction with the vanadium trihalide, as well as during preparation of and polymerization with catalyst component (A).

The alkylaluminum alkoxide compound employed to treat catalyst component (A) so as to regulate the molecular weight distribution (MWD) of the polymers produced with the catalyst of the present invention has the formula:

$$R_nAl(OR^1)_{3-n}$$

wherein:
R and R$^1$ are alkyl radicals containing from 1 to 14 carbon atoms, which radicals may be the same or different, and
n is an integer having a value of from 1 to 2.

Preferably R$^1$ and R$^2$ are alkyl radicals containing from 1 to 6 carbon atoms. Such alkyl radicals may be cyclic, branched or straight chain, and may be substituted with one or more substituents which are inert under the reaction conditions employed during preparation of and polymerization with catalyst component (A). Diethylaluminum ethoxide and ethylaluminum diethoxide are preferred A solid, particulate, porous inorganic material is employed as carrier in the preparation of catalyst component (A). The carrier serves as support for both the vanadium trihalide/electron donor reaction product and the alkylaluminum alkoxide molecular weight distribution (MWD) regulator. Suitable carriers include such materials as oxides of silicon, aluminum and zirconium, as well as phosphates of aluminum. Usually these materials have an average particle size of from about 10 microns to about 250 microns, preferably from about 20 microns to about 150 microns, and a surface area of at least 3 square meters per gram, preferably at least 50 square meters per gram. Polymerization activity of the catalyst can be improved by employing a silica support having an average pore size of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support.

Catalyst component (A) is prepared by treating a solid, particulate, porous inorganic carrier with:
(1) the reaction product of (a) a vanadium trihalide and (b) an electron donor, and
(2) an alkylaluminum alkoxide molecular weight distribution (MWD) regulator having the formula $R_nAl(OR^1)_{3-n}$, wherein R, R$^1$ and n are as defined above.

The vanadium trihalide/electron donor reaction product is prepared by dissolving at least one vanadium trihalide in at least one electron donor at a temperature of from about 20° C. up to the boiling point of the electron donor. Dissolution of the vanadium trihalide in the electron donor can be facilitated by stirring, and in some instances by refluxing, the vanadium trihalide in the electron donor. Up to several hours of heating may be required to complete dissolution.

After the vanadium trihalide has been dissolved in the electron donor, the reaction product is impregnated into the carrier Impregnation may be effected by adding the carrier to the solution of the vanadium trihalide in the electron donor, and then drying the mixture to remove excess electron donor. The carrier may be added alone as a dry powder or, if desired, as a slurry in additional electron donor. Alternatively, the solution of the vanadium trihalide in the electron donor may be added to the carrier. Ordinarily the carrier and the solution of the vanadium trihalide in the electron donor are mixed together in such amounts that, after drying, the impregnated carrier contains from about 0.05 mmoles to about 0.6 mmoles of vanadium per gram, preferably from about 0.3 mmoles to about 0.6 mmoles of vanadium per gram, and most preferably from about 0.3 mmoles to about 0.5 mmoles of vanadium per gram. The impregnated vanadium trihalide/ electron donor reaction product prepared in this manner contains from about 1 mole to about 5 moles, preferably from about 2 moles to about 4 moles, and most preferably about 3 moles of electron donor per mole of vanadium trihalide. Excess electron donor not actually complexed with the vanadium trihalide may remain adsorbed on the carrier without ill effects.

The alkylaluminum alkoxide molecular weight distribution (MWD) regulator is usually added to the carrier after it has been impregnated with the vanadium trihalide/electron donor reaction product. However, if desired, the alkylaluminum alkoxide compound may be added to the carrier before it is impregnated with the vanadium trihalide/electron donor reaction product. Addition of the alkylaluminum alkoxide compound to the carrier may be effected by dissolving one or more such compounds in one or more inert liquid solvents capable of dissolving such compounds, immersing the carrier in the solution, and then drying the mixture to remove the solvent. If the alkylaluminum alkoxide compound is applied subsequent to the vanadium trihalide/electron donor reaction product, the solvent must be one which does not dissolve the vanadium trihalide/electron donor reaction product. The carrier may be added to the solution of the alkylaluminum alkoxide compound alone as a dry powder or, if desired, as a slurry in additional inert liquid solvent. Alternatively, the solution of the alkylaluminum alkoxide compound may be added to the carrier. Ordinarily the carrier and the solution of the alkylaluminum alkoxide compound in the inert liquid solvent are mixed together in such amounts that, after drying, the carrier contains from about 0.1 mole to about 10 moles, preferably from about 2 moles to about 5 moles, of alkylaluminum alkoxide per mole of vanadium trihalide/ electron donor reaction product present in the carrier (or to be added to the carrier if it is applied subsequent to the modifier).

Among the solvents which can be employed to dissolve the alkylaluminum alkoxide compound are hydrocarbon solvents such as isopentane, hexane, heptane, toluene, xylene and naphtha.

The amount of alkylaluminum alkoxide compound employed in the preparation of catalyst component (A) depends upon the particular alkylaluminum alkoxide compound employed and the molecular weight distribution desired in the polymers to be produced with the treated catalyst. Catalysts of the type employed herein which have been treated with a boron halide or alkylaluminum compound rather than an alkylaluminum alkoxide compound have been found to produce polymers having a molecular weight distribution ($M_w/M_n$) in excess of 10 up to about 22. This corresponds to a melt flow ratio (MFR) in excess of 60 up to about 130. By treating such catalysts with the alkylaluminum alkoxide compounds described herein, however, rather than with a boron halide or alkylaluminum compound, it is possible to lower the melt flow ratio (MFR) of the polymers produced up to as much as 50 percent, depending upon the amount of alkylaluminum alkoxide compound employed. Reductions of up to 50 percent in melt flow ratio (MFR) usually require a molar ratio of alkylaluminum alkoxide compound to vanadium trihalide/electron donor reaction product of from about 1:1 to about 15:1, preferably from about 2:1 to about 10:1. Lesser amounts of alkylaluminum alkoxide compound bring about lesser reductions in melt flow ratio (MFR). However, greater amounts of alkylaluminum alkoxide compound have not been found to provide any further reduction in melt flow ratio (MFR). Generally, the alkylaluminum alkoxide compound is employed in amounts such as to provide a molar ratio of alkylaluminum alkoxide compound to vanadium trihalide/electron donor reaction product of from about 0.1:1 to about 30:1, preferably from about 0:2:1 to about 10:1, depending upon the desired result.

As previously disclosed, it is also possible to regulate the molecular weight of the polymers produced by the use of a suitable chain transfer agent, such as hydrogen, during polymerization. Generally, hydrogen is employed and added to the reactor in an amount sufficient to produce a hydrogen:ethylene mol ratio of from about 0.00001:1 to about 0.5:1, depending upon the melt index desired in the polymer product. In addition to hydrogen, other chain transfer agents may be employed to regulate the molecular weight of the polymers.

The ability to regulate the molecular weight distribution of the polymers over a broad molecular weight range allows polymer properties to be tailored for use in multifarious applications and greatly increases the versatility of the catalyst system.

Component (B) of the catalyst system of the present invention is an alkylaluminum cocatalyst having the formula $$Al(R^2)_3$$

wherein $R^2$ is a saturated hydrocarbon radical containing from 1 to 14 carbon atoms, which radicals may be the same or different. Such radicals may be substituted with one or more substituents which are inert under the reaction conditions employed during polymerization. Preferably $R^2$ is an alkyl radical containing from 2 to 8 carbon atoms.

Component (C) of the catalyst system of the present invention is a halohydrocarbon polymerization promoter having the formula $$R^3_b CX'_{(4-b)}$$

wherein
  $R^3$ is hydrogen or an unsubstituted or halosubstituted alkyl radical containing from 1 to 6 carbon atoms, which radicals may be the same or different,
  $X'$ is halogen, and
  b is 0, 1 or 2.

Preferred promoters include flouro-, chloro- or bromo- substituted ethane or methane such as $CCl_4$, $CHCl_3$, $CH_2Cl_2$, $CBr_4$, $CFCl_3$, $CH_3CCl_3$, and $CF_2ClCCl_3$. Particularly preferred promoters are $CH_3CCl_3$, $CFCl_3$, and $CHCl_3$.

Polymerization is effected, with the catalyst system of the present invention by contacting ethylene, or a mixture of ethylene and at least one alpha-olefin having 3 to 8 carbon atoms, with the three components of the catalyst system, i.e., the solid catalyst component (treated with the alkylaluminum alkoxide compound), the alkylaluminum cocatalyst, and the halohydrocarbon polymerization promoter. While polymerization can be effected employing either solution, slurry or gas phase techniques, it is preferably effected in a fluid bed reaction system. Suitable fluid bed reaction systems are described, e.g., in U.S. Pat. Nos. 4,302,565, 4,302,566 and 4,303,771, the disclosures of which are incorporated herein by reference.

The solid catalyst component, cocatalyst and polymerization promoter can be introduced into the polymerization reactor through separate feed lines or, if desired, two or all of the components may be partially or completely mixed with each other before they are introduced into the reactor. In any event, the cocatalyst and polymerization promoter are employed in such amounts as to provide a molar ratio of the promoter to the alkylaluminum cocatalyst of from about 0.1:1 to about 10:1, preferably from about 0.2:1 to about 2:1, and the cocatalyst and the solid catalyst component are employed in such amounts as to provide an atomic ratio of aluminum in the cocatalyst to vanadium in the solid catalyst component of from about 10:1 to about 400:1, preferably from about 15:1 to about 60:1.

Both the cocatalyst and the polymerization promoter may be introduced into the reactor dissolved in an inert liquid solvent, i.e., a solvent which is nonreactive with all the components of the catalyst system as well as all the components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the polymerization promoter. If desired, less concentrated or more concentrated solutions can be employed, or, alternatively, the cocatalyst and polymerization promoter can be added in the absence of solvent, or, if desired, suspended in a stream of liquefied monomer. When a solvent is employed and polymerization is conducted in gas phase, the amount of solvent introduced into the reactor should be carefully controlled so as to avoid the use of excessive quantities of liquid which would interfere with such polymerization.

The solvents employed to dissolve the cocatalyst and the polymerization promoter may also be employed to introduce the solid catalyst component into the reactor. Higher boiling solvents, such as mineral oil, are preferred for this purpose. While the solid catalyst component may also be introduced into the reactor in the absence of solvent or suspended in liquefied monomer, such solvents may be employed to disperse the solid catalyst component and facilitate its flow into the reactor. Such dispersions generally contain from 1 weight percent to 75 weight percent of the solid catalyst component.

The alpha-olefins which may be polymerized with ethylene contain from 3 to 8 carbon atoms per molecule. These alpha-olefins should not contain any branching on any of their atoms closer than two carbon atoms removed from the double bond. Suitable alpha-olefins include propylene, butene-1, pentene-1, hexene-1, 4-methylpentene-1, heptene-1 and octene-1. The preferred alpha-olefins are propylene, butene-1, hexene-1, 4-methylpentene-1 and octene-1.

The temperature employed can vary from about 10° C. to about 115° C., preferably from about 80° C. to about 110° C., when polymerization is effected in gas phase or in a slurry, and from about 150° C. to about 250° C. when polymerization is effected in a solution. When polymerization is conducted in gas phase, the temperature, of course, must be maintained below the sintering temperature of the polymers produced in order to prevent polymer agglomeration. On the other hand, the temperature employed during gas phase polymerizations must be sufficiently elevated to prevent substantial condensation of the reaction mixture to the liquid state, as such condensation will cause the polymer particles being produced to cohere to each other and likewise aggravate the polymer agglomeration problem. This difficulty is normally associated with the use of alpha-olefins having 5 or more carbon atoms which have relatively high dew points. While some minor condensation is tolerable, anything beyond this will cause reactor fouling.

The pressure employed can vary from subatmospheric to superatmospheric. Pressures of up to about 7000 kPa, preferably of from about 70 kPa to about 3500 kPa, are suitable for gas phase, slurry and solution polymerizations.

If desired, polymerization may be conducted in the presence of an inert gas, i.e., a gas which is nonreactive under the conditions employed during polymerization. The reactor should, however, be maintained substantially free of undesirable catalyst poisons, such as moisture, oxygen, carbon monoxide, carbon dioxide, acetylene, and the like.

When polymerization is conducted in a fluid bed, the superficial gas velocity of the gaseous reaction mixture through the bed must exceed the minimum flow required for fluidization in order to maintain a viable fluidized bed.

The following Examples are designed to illustrate the process of the present invention and are not intended as a limitation upon the scope thereof.

The properties of the polymers produced in the Examples were determined by the following test methods:

Density

A plaque is made and conditioned for one hour at 120° C. to approach equilibrium crystallinity and is then quickly cooled to room temperature. Measurement for density is then made in a density gradient column, and density values are reported as grams/cm$^3$.

Melt Index (MI)

ASTM D-1238, Condition E. Measured at 190° C. and reported as grams per 10 minutes.

Flow Index (FI)

ASTM D-1238, Condition F. Measured at 10 times the weight used in the melt index text above.

Melt Flow Ratio (MFR)

Ratio of Flow Index: Melt Index.

Activity

Activity values are normalized values based upon grams of polymer produced per mmol of vanadium in the catalyst per hour per 100 psi of ethylene polymerization pressure.

EXAMPLE 1

Impregnation of Carrier with VCl$_3$/THF Reaction Product

To a flask equipped with a mechanical stirrer were added 4 liters of anhydrous tetrahydrofuran (THF), followed by 50 grams (0.318 mole) of solid VCl$_3$. The mixture was heated under nitrogen at a temperature of 65° C. for 5 hours with continuous stirring in order to completely dissolve the VCl$_3$.

Eight hundred grams (800 g) of silica gel were dehydrated by heating under nitrogen at a temperature of 600° C. for 20 hours. The dehydrated gel was added to the solution prepared as above, and the mixture was refluxed for one hour under nitrogen. At the end of this time, the mixture was heated at a temperature of 55° C. for about 6 hours under a purge of dry nitrogen to produce a dry, free-flowing powder containing about 8 weight percent THF.

EXAMPLE 2

Treatment of Carrier with Diethylaluminum Chloride

Five hundred grams (500 g) of the silica carrier impregnated with VCl$_3$/THF reaction product in accordance with Example 1 were slurried in 4 liters of anhydrous hexane. The slurry was continuously stirred while a 10 weight percent solution of diethylaluminum chloride in anhydrous hexane was added over a period of 30 minutes. The impregnated carrier and the diethylaluminum chloride solution were employed in amounts that provided an atomic ratio of aluminum to vanadium of 1.5:1. After addition of the diethylaluminum chloride solution was complete, the mixture was heated at a temperature of 45° C. for about 6 hours under a purge of dry nitrogen to produce a dry, free-flowing powder.

EXAMPLE 3

Treatment of Carrier with Diethylaluminum Ethoxide

Five grams (5.0 g) of the silica carrier impregnated with VCl$_3$/THF reaction product in accordance with Example 1 were slurried in 30 ml of anhydrous hexane. The slurry was continuously stirred while a one molar solution of diethylaluminum ethoxide in anhydrous hexane was added over a period of 5 minutes. After addition of the solution was complete, the mixture was stirred for an additional 30–60 minutes. At the end of this time, the mixture was heated at a temperature of 50° C. either under vacuum or under a purge of dry nitrogen to remove the hexane diluent and produce a free-flowing powder.

The procedure was repeated a number of times with various amounts of diethylaluminum ethoxide.

EXAMPLES 4-8

Copolymerization of Ethylene With Hexene-1

The solid catalyst components prepared as described in Example 3 were employed together with an alkylaluminum compound, as cocatalyst, and a halohydrocarbon compound (CFCl$_3$), as polymerization promoter, to co-polymerize ethylene and hexene-1 in a one-liter autoclave reactor.

In each polymerization, the three catalyst components were pre-mixed in a 6 ounce bottle containing 100 ml of hexane before being added to the reactor. Twenty milliliters (20.0 ml) of hexene-1 were added to the pre-mixed catalyst components before the resulting mixture was transferred to the reactor. Anhydrous conditions were maintained at all times.

The polymerization reactor was dried by heating at 96° C. under a stream of dry nitrogen for 40 minutes. After cooling the reactor to 50° C., 500 ml of hexane were added to the reactor, and the reactor contents were stirred under a gentle flow of nitrogen. The pre-mixed catalyst components were then transferred to the reactor under a stream of nitrogen and the reactor was sealed. The temperature of the reactor was gradually raised to 60° C. and the reactor was pressurized with hydrogen to a pressure of 10 kPa. The temperature was then raised to 75° C. and the reactor was pressurized to 1050 kPa with ethylene. Heating was continued until the desired polymerization temperature of 85° C. was attained. Polymerization was allowed to continue for 30 minutes, during which time ethylene was continually added to the reactor to maintain the pressure constant. At the end of 30 minutes, the reactor was vented and opened.

Table II below sets forth the details involving the composition of the catalysts employed in these polymerizations, as well as the reaction conditions employed during polymerization, the properties of the polymers produced, and the productivity of each catalyst system.

Shorthand designations employed in Table II are defined as follows:

TABLE I

| Designation | Definition |
| --- | --- |
| THF | Tetrahydrofuran |
| DEAC | Diethylaluminum chloride |
| DEAEO | Diethylaluminum ethoxide |
| TEAL | Triethylaluminum |
| TIBA | Triisobutylaluminum |

COMPARATIVE EXAMPLES A-C

For comparative purposes, ethylene was copolymerized with hexene-1 as in Examples 4–8 employing the solid catalyst components prepared in accordance with Example 1 (untreated) and Example 2 (treated with diethylaluminum chloride rather than diethylaluminum ethoxide). The details of these polymerizations are set forth in Table II below along with the details of Examples 4–8.

TABLE II

| EXAMPLE | Comp. Exp. A | Comp. Exp. B | 4 | 5 | 6 | Comp. Exp. C | 7 | 8 |
| --- | --- | --- | --- | --- | --- | --- | --- | --- |
| Catalyst | | | | | | | | |
| Carrier | SiO$_2$ | SiO$_2$ | SiO$_2$ | SiO$_2$ | SiO$_2$ | SiO$_2$ | SiO$_2$ | SiO$_2$ |
| Precursor | VCl$_3$/THF | VCl$_3$/THF | VCl$_3$/THF | VCl$_3$/THF | VCl$_3$/THF | VCl$_3$/THF | VCl$_3$/THF | VCl$_3$/THF |
| MWD Regulator | — | DEAC | DEAEO | DEAEO | DEAEO | DEAC | DEAEO | DEAEO |
| MWD Regulator/V Ratio | 0 | 1.5 | 1.5 | 3.0 | 3.0 | 4.5 | 4.5 | 4.5 |
| Cocatalyst | TEAL | TEAL | TEAL | TEAL | TIBA | TEAL | TEAL | TIBA |
| Al/V Ratio | 40 | 40 | 40 | 40 | 40 | 40 | 40 | 40 |

TABLE II-continued

| EXAMPLE | Comp. Exp. A | Comp. Exp. B | 4 | 5 | 6 | Comp. Exp. C | 7 | 8 |
|---|---|---|---|---|---|---|---|---|
| Promoter | $CFCl_3$ | $CFCl_3$ | $CFCl_3$ | $CFCl_3$ | $CFCl_3$ | $CFCl_3$ | $CFCl_3$ | $CFCl_3$ |
| Promoter/Al Ratio | 1.0 | 1.0 | 1.0 | 1.0 | 1.0 | 1.0 | 1.0 | 1.0 |
| Reaction Conditions | | | | | | | | |
| Temperature, °C. | 85 | 85 | 85 | 85 | 85 | 85 | 85 | 85 |
| Pressure, kPa | 1050 | 1050 | 1050 | 1050 | 1050 | 1050 | 1050 | 1050 |
| Reaction Time, minutes | 30 | 30 | 30 | 30 | 30 | 30 | 30 | 30 |
| Polymer Properties | | | | | | | | |
| Density, g/cm$^3$ | 0.950 | 0.949 | 0.946 | 0.943 | 0.946 | 0.944 | 0.946 | 0.945 |
| Melt Index, g/10 min. | 0.6 | 0.5 | 0.4 | 5.8 | 4.3 | 0.6 | 0.6 | 3.3 |
| Flow Index, g/10 min. | 49 | 42 | 27 | 220 | 219 | 47 | 36 | 168 |
| Melt Flow Ratio | 82 | 85 | 68 | 38 | 51 | 79 | 61 | 51 |
| Activity | | | | | | | | |
| g polymer/mmol V-Hr-100 psi $C_2H_4$ | 969 | 1261 | 1143 | 1570 | 2226 | 1816 | 2521 | 3566 |

We claim:

1. A solid catalyst component consisting essentially of:
   (1) a solid, particulate, porous inorganic carrier, as support for
   (2) the reaction product of (a) a vanadium trihalide and (b) an electron donor,
   (3) an alkylaluminum alkoxide molecular weight distribution regulator having the formula $$R_nAl(OR^1)_{3-n}$$

wherein:
   R and $R^1$ are alkyl radicals containing from 1 to 14 carbon atoms, and
   n is an integer having a value of from 1 to 2.

2. A solid catalyst component as in claim 1 wherein R and $R^1$ are alkyl radicals containing from 1 to 6 carbon atoms.

3. A solid catalyst component as in claim 2 wherein the alkylaluminum alkoxide molecular weight distribution regulator is diethylaluminum ethoxide.

4. A solid catalyst component as in claim 1 wherein the inorganic carrier contains from 2 moles to 5 moles of the alkylaluminum alkoxide molecular weight distribution regulator per mole of vanadium trichloride/electron donor.

5. A solid catalyst component as in claim 4 wherein R and $R^1$ are alkyl radicals containing from 1 to 6 carbon atoms.

6. A solid catalyst component as in claim 5 wherein the alkylaluminum alkoxide molecular weight distribution regulator is diethylaluminum ethoxide.

7. A catalyst system comprising:
   (A) the solid catalyst component of claim 1,
   (B) an alkylaluminum cocatalyst having the formula $$Al(R^2)_3$$

wherein:
   $R^2$ is a saturated hydrocarbon radical containing from 1 to 14 carbon atoms, and
   (C) a halohydrocarbon polymerization promoter having the formula $$(R^3)_bCX'_{(4-b)}$$

wherein:
   $R^3$ is hydrogen or an unsubstituted or halosubstituted alkyl radical containing from 1 to 6 carbon atoms,
   X' is halogen, and
   b is 0, 1 or 2.

8. A catalyst system as in claim 7 wherein R and $R^1$ are alkyl radicals containing from to 6 carbon atoms.

9. A catalyst system as in claim 8 wherein the alkylaluminum alkoxide molecular weight distribution regulator is diethylaluminum ethoxide.

10. A catalyst system as in claim 7 wherein the inorganic carrier contains from 2 moles to 5 moles of the alkylaluminum alkoxide molecular weight distribution regulator per mole of vanadium trichloride/electron donor.

11. A catalyst system as in claim 10 wherein R and $R^1$ are alkyl radicals containing from to 6 carbon atoms.

12. A catalyst system as in claim 11 wherein the alkylaluminum alkoxide molecular weight distribution regulator is diethylaluminum ethoxide.

* * * * *